United States Patent [19]

Troxel

[11] 4,340,912

[45] Jul. 20, 1982

[54] RANDOM SCREEN GENERATOR APPARATUS FOR PRODUCING HALFTONE IMAGES

[75] Inventor: Donald E. Troxel, Belmont, Mass.

[73] Assignee: AM International, Inc., Chicago, Ill.

[21] Appl. No.: 187,292

[22] Filed: Sep. 15, 1980

[51] Int. Cl.³ ............................................. H04N 1/40
[52] U.S. Cl. ................................................. 358/283
[58] Field of Search ....................................... 358/283

[56] References Cited

U.S. PATENT DOCUMENTS

| 3,916,096 | 10/1975 | Everett | 358/283 |
| 4,040,094 | 8/1977 | Everett | 358/283 |
| 4,080,634 | 3/1978 | Schreiber | 358/298 |

OTHER PUBLICATIONS

Smith; G. L., "Halftone Image Produced by Pseudo-Random Bit Generator", *IBM Tech. Disclosure Bulletin*, Dec. 1974, vol. 17, No. 7, pp. 1858-1859.

*Primary Examiner*—Howard Britton
*Attorney, Agent, or Firm*—Anthony W. Karambelas; Robert C. Curfiss

[57] ABSTRACT

An apparatus is provided for generating a random (mezzotint) screen for producing halftone copies of continuous tone documents. The random screen comprises a matrix of random numbers representing a sequence of digital reference values with respect to which video (scan) signals are compared for producing halftone picture elements (pels). The apparatus comprises a first and a second random number generator, the first being disposed for providing an initial or starting state for the second, in response to applied clock pulses. Using the supplied starting state, the second random number generator produces the random screen reference values in response to applied clock signals. The random screen reference values produced by the apparatus permits minimum halftone dot size (i.e., the size of the dot used in producing halftone images) to be varied, and halftone patterns to be selectively repeated or not repeated.

10 Claims, 10 Drawing Figures

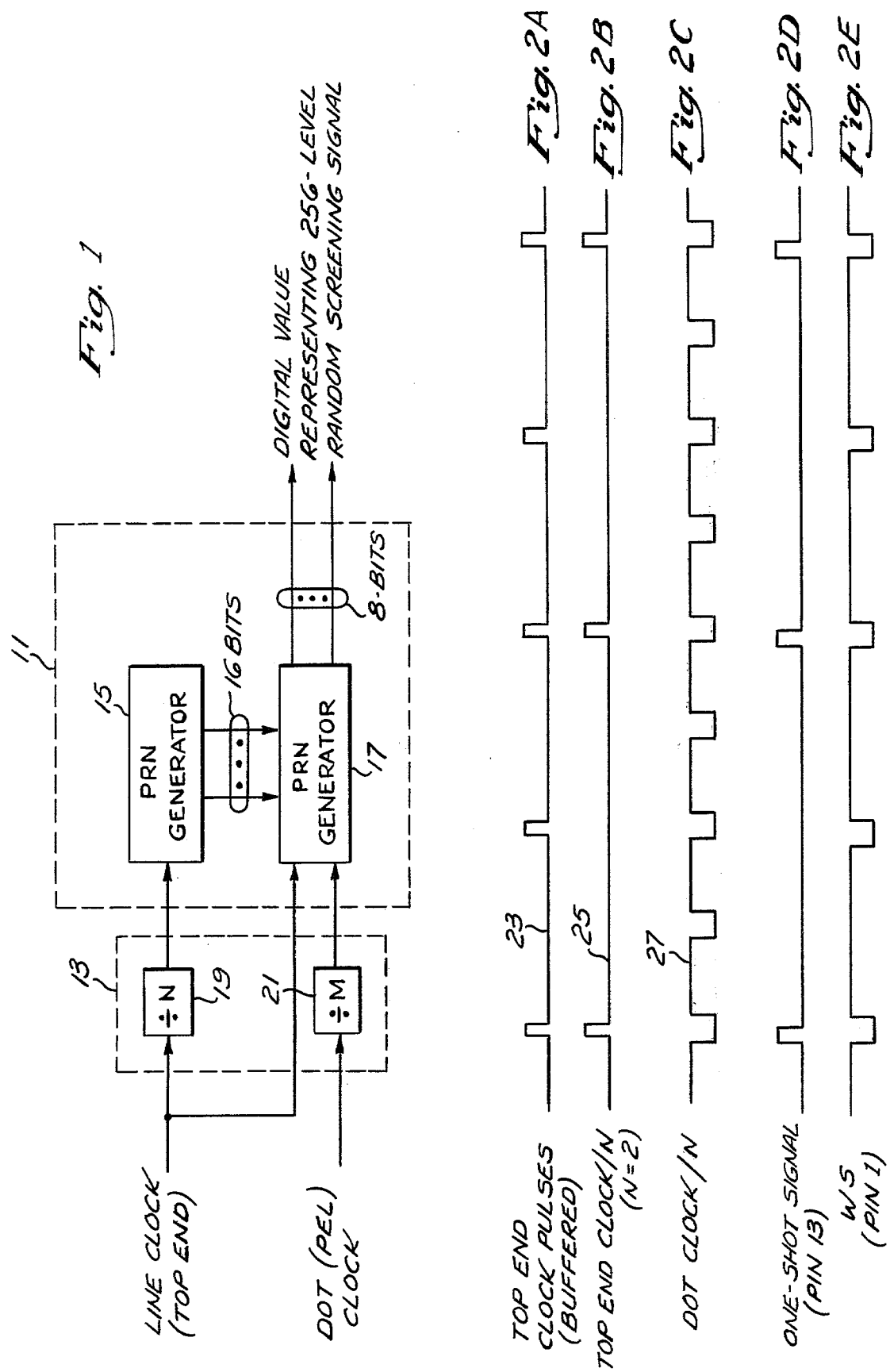

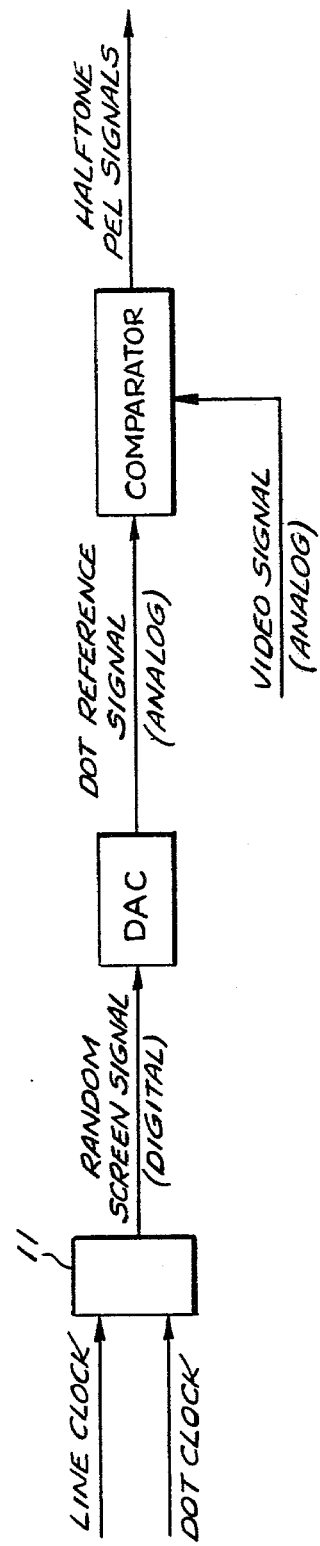
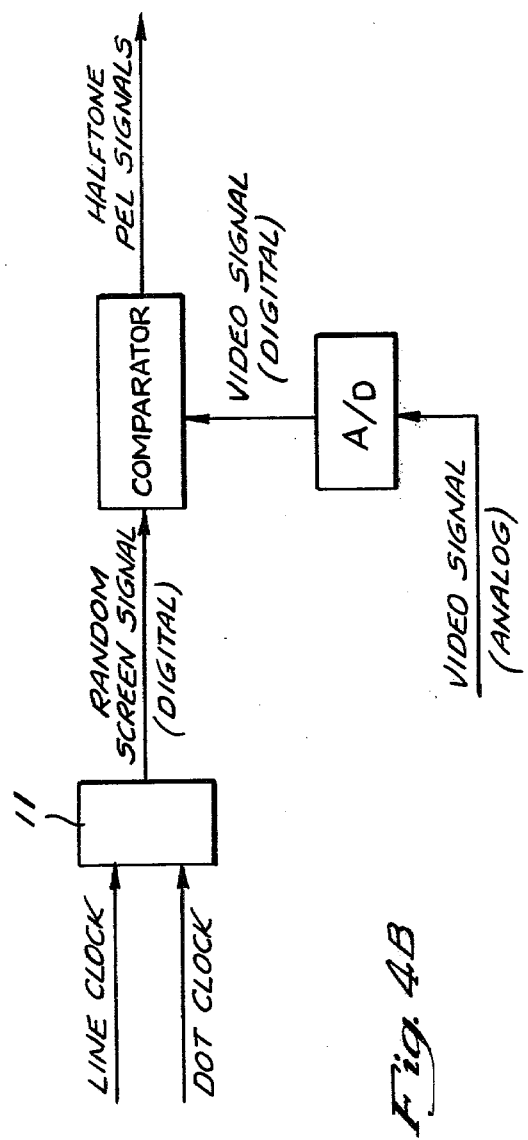
Fig. 4A
Fig. 4B

RANDOM SCREEN GENERATOR APPARATUS FOR PRODUCING HALFTONE IMAGES

BACKGROUND OF THE INVENTION

This invention relates to the use of a digital screen in the making of halftone copies of continuous tone documents.

In the past halftones were produced mainly by process camera contact screening methods. In modern graphics processing, electro-optical systems employing digital screens and laser scanning methods are also used. One such system is disclosed, for example, in U.S. Pat. No. 4,080,634 issued to William F. Schreiber on Mar. 21, 1978. The disclosure made by this patent is incorporated herein by reference. In that system an original document is scanned to produce video signals. The halftone screening is then performed by comparing the video signals with a succession of non-random dot reference signals, stored in digital form, representing the desired halftone screening pattern. Output circuitry then generates halftone recording signals, each of which is based upon the result of comparing the video and reference signals.

Non-random screens used in the system disclosed in the above-mentioned patent are quite suitable in graphically reproducing numerous details of the original document. However, certain other details are not reproduced as satisfactorily with non-random screens as with random screens. One system employing random screens (and a random number generator in generating the random screen) is disclosed, for example, in U.S. Pat. No. 4,040,094 issued to inventors Robert Charles Everett, et. al on Aug. 2, 1977. A problem with the use of such random-numbergenerated screens, however, is that since by being random they produce screen lines that are successively different, they tend to limit the dot size used in producing the halftone image and tend to "break up" desired repetitive patterns in the reproduced (recorded) image.

What is needed, therefore, is a random screen which is capable of meeting the requirements (e.g., different minimum dot sizes) of various printing processes which could be incorporated into a halftone reproduction device for providing (in addition to the effect produced by non-random screens) a random screening effect, yet permit the generation of repetitive patterns, thereby not limiting the dot size.

SUMMARY OF THE INVENTION

In accordance with the illustrated preferred embodiment of the present invention, a random screen digital signal generator is provided which is capable of providing a random screening effect (i.e. random distribution of dots over the face of the reproduced or recorded halftone image) and capable of generating a repetitive pattern, permitting the selection of various minimum dot sizes.

The random screen digital signal generator comprises two random number generators. One random number generator is used to provide a starting state for the other (second) random number generator in response to an applied first clock pulse. Using this starting state provided by the first random number generator, the second random number generator produces a sequence (for example, an N×M matrix) of digital screen values in response to the first clock pulse and a second applied clock pulse. The sequence or matrix of digital screen values represents the elements a random screen reference signal with whic video signals are compared to produce halftone signal values. Scan line clock pulses specify the rate at which lines of the original document are scanned. Dot clock pulses specify the rate at which dots are recorded in the reproduced document to produce the the halftone effect. The first clock pulse has a frequency of equal to that of the scan line clock pulses divided by N. The second clock pulse has a frequency equal to that of the dot clock pulses divided by M; where N and M are integers representing selected numbers of row and column elements of the matrix of random screen elements.

BRIEF DESCRIPTION OF THE DRAWINGS

FIG. 1 is a block diagram of the random screen generator apparatus of the present invention.

FIGS. 2A,2B,2C,2D and 2E are timing diagrams showing timing relationships between selected signals utilized in the apparatus of FIG. 1.

FIGS. 4A and 4B are block diagrams showing alternative ways in which the apparatus of FIG. 1 may be utilized.

DESCRIPTION OF THE PREFERRED EMBODIMENT

Figure 3:
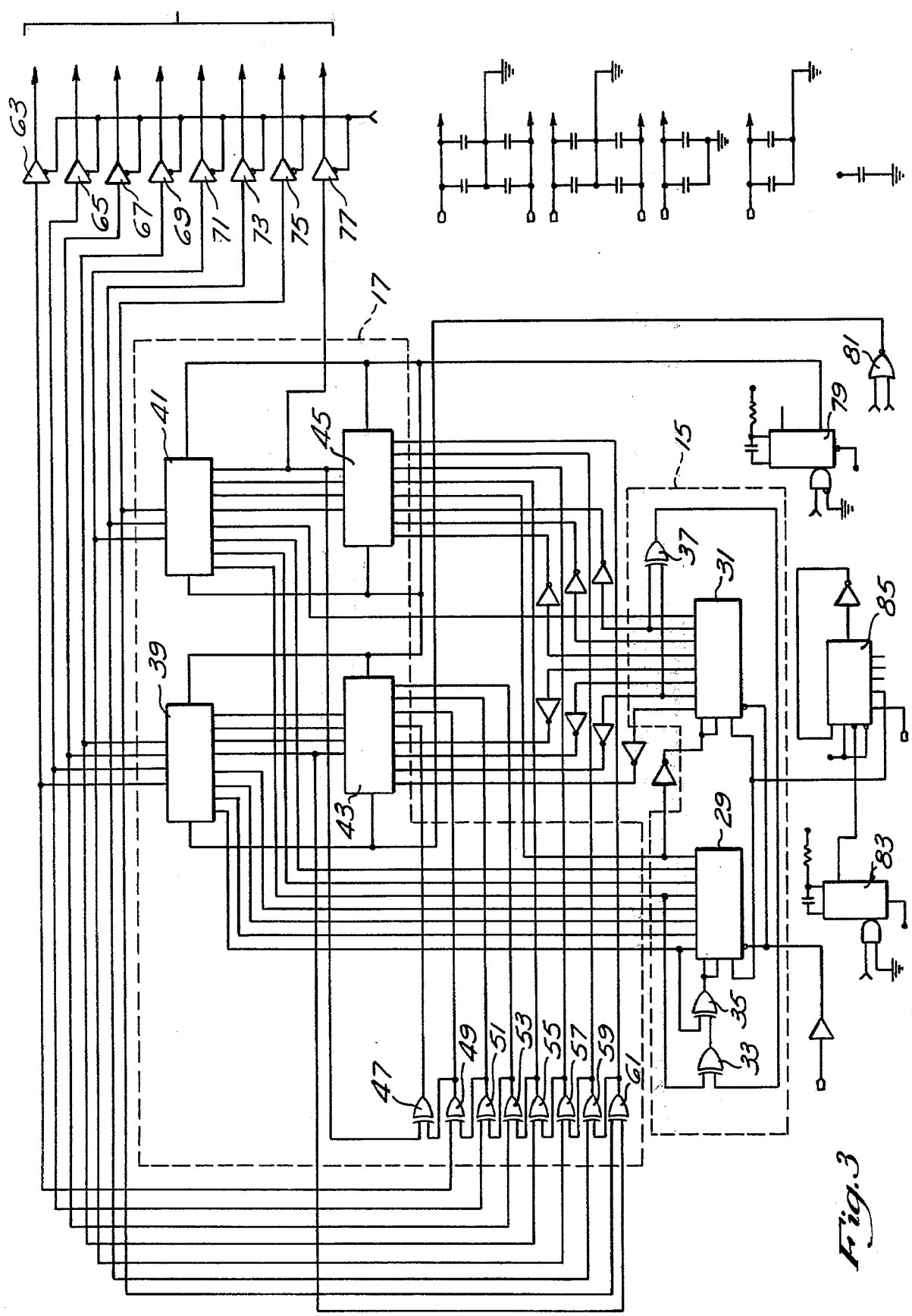
FIG. 3 is a schematic diagram showing the apparatus of FIG. 1 in greater detail.

Referring now to FIG. 1, there is shown a Random Screen Signal Generator 11 comprising a first pseudo-random number generator 15 and a second pseudo-random number generator 17. (The number generators are pseudo-random because the sequences generated by them are only seemingly random. In fact, the present state of such a generator is completely determined. Thus, if the initial state is fixed, the output sequence that follows will always be the same.) A timing generator 13 may also be included in random screen generator 11. The timing generator 13 includes a first frequency divider circuit 19 and a second frequency divider circuit 21.

A first clock signal of selected frequency is applied to divider circuit 19 and to second random generator 17. The clock signal represents a selected scan rate, namely, a rate at which a line of an input document (not shown) is scanned by a light beam such as a laser beam. As shown in FIG. 2A this first clock (line clock) signal 21 comprises a series of pulses (TOP END) signal is divided by a selected quantity N by divider circuit 19 to produce a clock signal of selected lesser frequency. For example, if N=2, signal 23 shown in FIG. 2B would be produced. Actually, N represents the number of scan lines or row elements of a matrix of PEL reference signal values. Thus, each TOP END pulse applied at the beginning of each scanning cycle may be used (e.g., by a logic unit, not shown) to shift from one row of PEL reference signal values to the next.

As shown in U.S. Pat. No. 4,080,634, dot clock (pel clock) timing pulses are utilized in determining the rate at which PEL reference signal values are accessed, the rate at which video signals are sampled and the rate at which pel recording signals are produced by a dot generator. According to the present invention, in the apparatus 11 the frequency of the dot clock signal is divided by a selected quantity M by divider circuit 21 to produce timing pulses 25 of a selected lesser frequency, as shown in FIG. 2C. The variable M, which may be any integer, represents the number of column elements of the matrix (cell) of the PEL reference signal values.

Generators 15 and 17 include a plurality of shift registers, each register having sixteen stages. Generator 15 generates a sequence of sixteen-bit numbers and loads each number into generator 17 as the starting state for generator 17. In response to the applied (loads) sixteen-bit number, generator 17 produces a sequence of eight-bit numbers. Generator 15 is loaded with a number from generator 15 upon each occurrence of a top end (scan line) clock pulse. However, because generator 15 produces a new sixteen-bit number only every Nth scan line (i.e., upon application of a pulse every line clock/N), generator 17 is loaded with a new (i.e., unchanged) sixteen-bit number only every Nth top end pulse. (N being any integer, for example 1, 2, 5 or 8). Once loaded, generator 17, which is clocked on every Mth dot clock, produces an eight-bit number (based upon the sixteen-bit number from generator 15) upon each occurrence of a pulse with the rate "pel rate/M".

If only a single random number generator were used, successively different lines would be produced, effectively limiting the dot size to one pel. Therefore, to ensure that the sequences are free of noticeable structure in their length of $2^{16}$ pels (i.e., a minimum length of ninety inches at seven hundred and twenty-two pels per inch), and also not be limited to a dot size of one pel, a two-generator system is used. The first binary generator 15, which is clocked at the line scanning rate ÷ N produces the starting state for the second binary generator 17. The latter 17, which is clocked at the pel rate ÷ M, produces a 256-level pseudo-random number sequence; when N = 16 and M = 16, each identical for N scan lines. Thus, a page may be said to be divided into N×M pel squares, in each of which squares the pseudo-random number is constant.

The following description assumes the use of a 2×2 pel dot (i.e., N=2 and M=2). As shown in FIG. 3, pseudo-random generator 15 inclues two serial-input, parallel-output shift registers 29 and 31 with feedback provided by three XOR gates 33, 35 and 37. Shift clock pulses at pin eight of each of the shift registers cause data to shift through the registers and new data to be entered at pin 1 of register 29. The Q outputs of registers 29 and 31 form a 16-bit digital word to be loaded into the $A_1 B_1 C_1 D_1$ inputs to multiplexers (multiplexed buffer registers) 39, 41, 43, 45. Pseudo-random generator 17 comprises multiplexers 39, 41, 43, 45, and XOR gates 47–61. When their inputs (WS) at pin 1 are high, the multiplexers 39, 41, 43, 45 select $A_2 B_2 C_2 D_2$ inputs and stores these values on the rising clock edge (falling edge of the Dot Clock/N pulse). Shift clock pulses received while WS is high cause data to shift through the four multiplexers 39, 41, 43, 45. Eight Q outputs from the multiplexers are grouped to deliver eight-bit words to the bus drivers 63–77. If the WS inputs of the multiplexers are are low when a shift clock pulse is received, then the $A_1 B_1 C_1 D_1$ inputs will be stored. In this manner, pseudo-random generator 17 may be set to a known initial state.

As shown in FIGS. 2A, 2E and 3, top end clock pulses, applied via pin twelve of one-shot multivibrator circuit 79, momentarily changes, from high to low, the WS signal on pin one of the four multiplexers at the beginning of every scan line. During this period, the trailing edge of each buffered top end pulse applied through gate 81, clocks the four multiplexers 39, 41, 43, 45. Thus, the multiplexers are initialized to the output of pseudo-random generator 15, however, is clocked through one-shot multi-vibrator circuit 83 and counter circuit 85 by Top-End/N signal 25. Where N=2, pseudo-random generator 15 is clocked every second Top End pulse as shown in FIG. 2B. (Actually pseudo-random generator 15 is clocked eight times in rapid succession: counter circuit 85, enabled by a high output on pin 13 of one-shot multi-vibrator circuit 83, counts applied 2.5 MHZ pulses and produces, via output pin $Q_A$, eight output pulses counted, allowing pseudo-random number genrator 15 to be clocked by the eight rising edges of the $Q_A$ output pulses).

Operating in this manner, for N=2, the random screen signal generator 11 generates a long "random" sequence for one scan line, generates the identical sequence on the next line, generates a new sequence on the third line, generates a duplicate of the new sequence on the fourth line, and so on.

Figure 5:
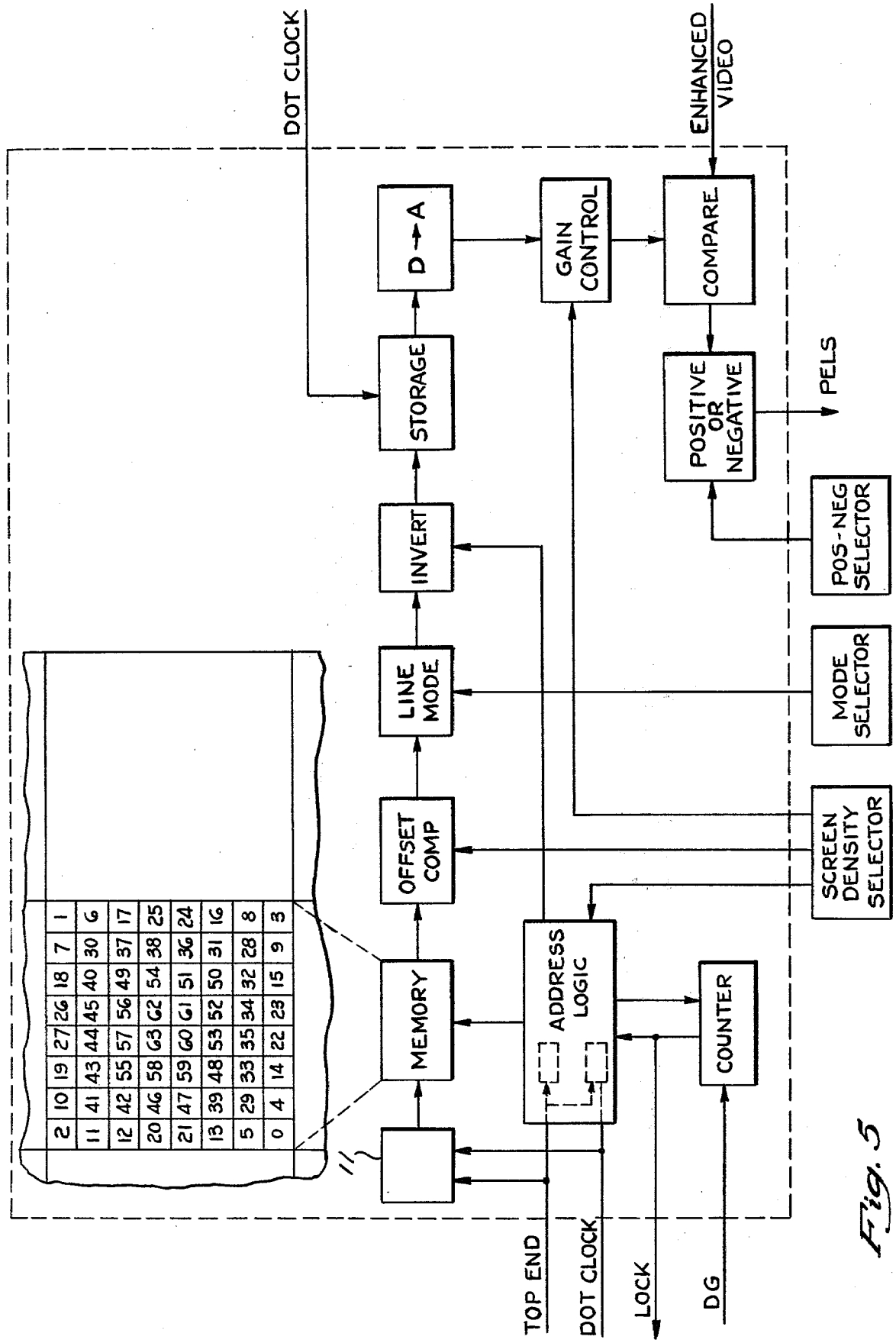
FIG. 5 is a block diagram showing still another way in which the apparatus of FIG. 1 may be utilized.

Random screen generator apparatus 11 may be utilized in any of the ways shown in FIGS. 4A, 4B or 5. For example, the digital output from apparatus 11 may be converted to analog form before being compared to the video (scan) signal to produce halftone pel signals, as shown in FIG. 4A. Alternatively, the digital output from apparatus 11 may be retained in digital form and the video signal converted to digital form prior to performance of the comparison. Also, although an undesired amount of memory storage may be required, the apparatus 11 may be included in a dot generator (e.g., the dot generator disclosed in U.S. Pat. No. 4,080,634), as shown in FIG. 5.

What is claimed is:

1. Apparatus for producing random digital numbers useable as random screen reference values in producing halftone images, the apparatus comprising:
   a first random number generator means responsive to an applied first clock signal for producing a first output in accordance with the frequency of the first clock signal; and
   a second random number generator means coupled to receive the first output and a second clock signal for producing a sequence of random screen reference values in accordance with the frequency of the second clock signal, the first output being used as a starting state by the second random generator means.

2. The apparatus as in claim 1 wherein the second random number generator means is coupled to also receive a third clock signal, the frequency of the third clock signal corresponding to the rate at which lines of an original document are scanned.

3. The apparatus as in claim 2 wherein the frequency of the first clock signal corresponds to the frequency of the third clock signal divided by a selected number N.

4. The apparatus as in claim 3 wherein the frequency of the second clock signal corresponds to the frequency of a fourth clock signal divided by a selected number M, the frequency of the fourth clock signal corresponding to the rate at which dots are recorded in an output document.

5. The apparatus as in claim 4 wherein the sequence of random screen reference values is an N×M matrix of digital numbers used in producing halftone images from continuous tone original documents.

6. The apparatus as in claim 5 wherein the halftone images have at least one of a random pattern and a repetitive pattern, and have a variable dot size, the dot size being defined by the matrix N×M.

7. The apparatus as in claim 6 wherein N defines the number of times a repetitive pattern is repeated, and M defines the number of times a random pattern is generated.

8. The apparatus as in claim 7 wherein the first and second random number generator means each includes a plurality of registers.

9. The apparatus as in claim 8 further including a timing generator responsive to the third and fourth clock signals for producing the first and second clock signals.

10. The apparatus as in claim 9 wherein the timing generator includes a first frequency divider circuit for performing the frequency division by N, and includes a second frequency divider circuit for performing the frequency division by M.

* * * * *